US011216598B2

(12) United States Patent
Schramm et al.

(10) Patent No.: US 11,216,598 B2
(45) Date of Patent: Jan. 4, 2022

(54) SECURING A COMPUTER AT A DOCKING STATION

(71) Applicant: HEWLETT-PACKARD DEVELOPMENT COMPANY, L.P., Houston, TX (US)

(72) Inventors: Mauricio Schramm, Porto Alegre (BR); Tadeu Marchese, Porto Alegro (BR)

(73) Assignee: Hewlett-Packard Development Company, L.P., Spring, TX (US)

( * ) Notice: Subject to any disclaimer, the term of this patent is extended or adjusted under 35 U.S.C. 154(b) by 334 days.

(21) Appl. No.: 16/332,160

(22) PCT Filed: Sep. 12, 2016

(86) PCT No.: PCT/US2016/051255
§ 371 (c)(1),
(2) Date: Mar. 11, 2019

(87) PCT Pub. No.: WO2018/048436
PCT Pub. Date: Mar. 15, 2018

(65) Prior Publication Data
US 2019/0370506 A1 Dec. 5, 2019

(51) Int. Cl.
*G06F 21/88* (2013.01)
*E05B 73/00* (2006.01)
(Continued)

(52) U.S. Cl.
CPC .......... *G06F 21/88* (2013.01); *E05B 73/0082* (2013.01); *G06F 1/1632* (2013.01);
(Continued)

(58) Field of Classification Search
CPC .... G06F 21/88; G06F 1/1632; E05B 73/0082; E05B 2073/0088
See application file for complete search history.

(56) References Cited

U.S. PATENT DOCUMENTS 9,163,433 B2   10/2015  Sedon
2008/0209965 A1*  9/2008  Maack ............... G06F 21/6209
70/262

(Continued)

FOREIGN PATENT DOCUMENTS

EP         2653993 A1    10/2013

OTHER PUBLICATIONS

IP.com Electronic lock for device docking IP.com No. IPCOM000146732D (Year: 2007).*

(Continued)

Primary Examiner — David J Pearson
(74) Attorney, Agent, or Firm — Fabian VanCott

(57) ABSTRACT

A method of securing a computer at a docking station, where the docking station includes a physical lock for selectively engaging with a locking interface of the computer to prevent removal of the computer from the docking station, the method includes: during a period of time in which the computer is registering a presence of an authenticated user at the computer, maintaining the physical lock of the docking station in an unlocked state disengaged from the locking interface of the computer; and when the computer is entering a locked state in response to a departure of the authenticated user from the computer, signaling the physical lock of the docking station to engage with the locking interface of the computer to prevent removal of the computer from the docking station.

19 Claims, 9 Drawing Sheets

(51) Int. Cl.
*G06F 1/16* (2006.01)
*G06F 21/32* (2013.01)
*G06F 21/86* (2013.01)

(52) U.S. Cl.
CPC .............. *G06F 21/32* (2013.01); *G06F 21/86* (2013.01); *E05B 2073/0088* (2013.01); *G06F 2221/2139* (2013.01)

(56) References Cited

U.S. PATENT DOCUMENTS

| | | | |
|---|---|---|---|
| 2009/0145184 A1* | 6/2009 | Cheaz | G06F 1/1601 70/266 |
| 2009/0161303 A1 | 6/2009 | Hirota | |
| 2009/0210089 A1* | 8/2009 | Christie | G07F 11/62 700/244 |
| 2009/0002931 A1 | 11/2009 | Feng et al. | |
| 2013/0194067 A1* | 8/2013 | Kimbrell | H04W 12/08 340/5.54 |
| 2014/0338408 A1 | 11/2014 | Hsu et al. | |
| 2015/0005944 A1* | 1/2015 | Longobardi | E05B 73/0082 700/275 |
| 2015/0154839 A1* | 6/2015 | Stoddard | G08B 13/1445 340/568.2 |
| 2015/0179008 A1 | 6/2015 | Sung et al. | |
| 2015/0186685 A1 | 7/2015 | Vroom et al. | |
| 2016/0062403 A1* | 3/2016 | Risher-Kelly | G06F 13/4081 710/304 |
| 2016/0090757 A1 | 3/2016 | Aisaka | |
| 2017/0177029 A1* | 6/2017 | Nguyen | G06F 21/445 |
| 2017/0222366 A1* | 8/2017 | Gee | H01R 13/639 |
| 2019/0034668 A1* | 1/2019 | Novoa | G06F 21/85 |

OTHER PUBLICATIONS

Universal Shroud for Portable Electronic Device, May 26, 2016, <http://www.tdcommons.org/cgi/viewcontent.cgi?article=1006&context=invue >.

\* cited by examiner

SECURING A COMPUTER AT A DOCKING STATION

BACKGROUND

Laptop, notebook and tablet computers provide useful portability. A user can take such a portable computer for use away from his or her desk such as in a meeting or while traveling. However, when used at a desk, a portable computer may be connected to a docking station that provides the portable computer with additional resources, including peripheral devices, such as a larger monitor or keyboard that is available on the portable computer itself.

BRIEF DESCRIPTION OF THE DRAWINGS

The accompanying drawings illustrate various implementations of the principles described herein and are a part of the specification. The illustrated implementations are merely examples and do not limit the scope of the claims.

Throughout the drawings, identical reference numbers designate similar, but not necessarily identical, elements.

DETAILED DESCRIPTION

Figure 1:
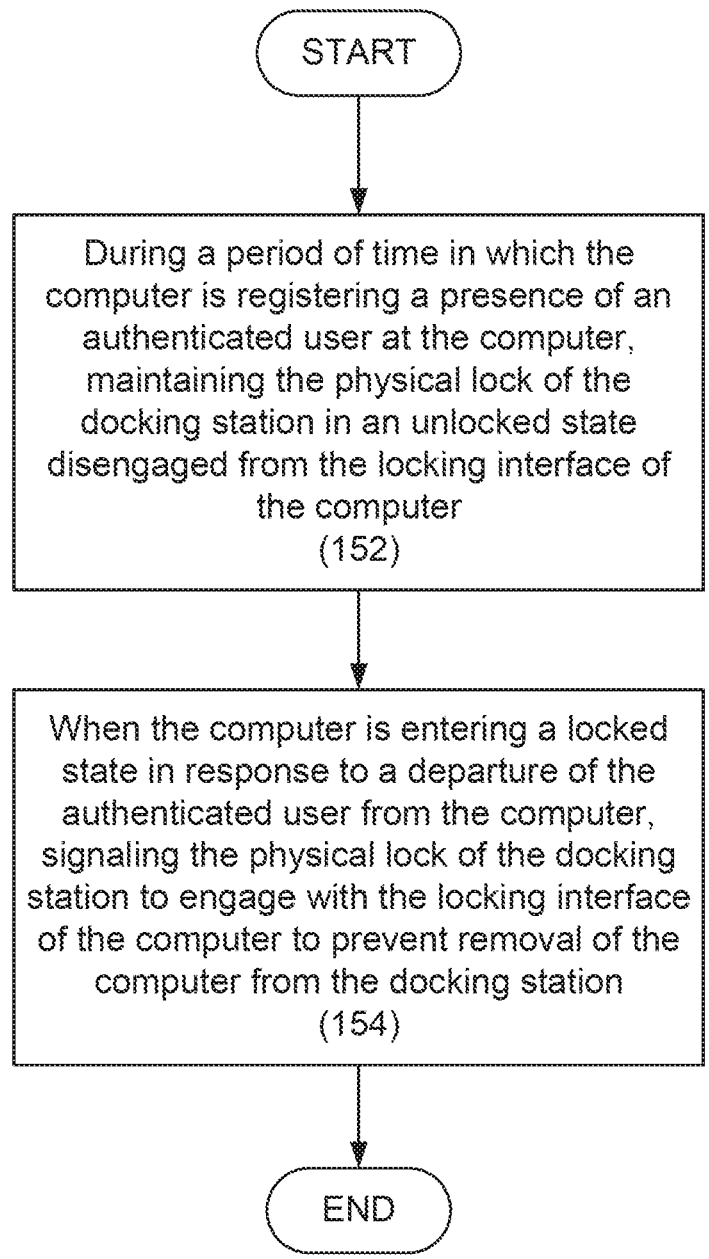
FIG. 1 is a flow chart of an example method of securing a computer at a docking station consistent with the disclosed implementations.

As described above, a docking station can be used at a specific work location to provide additional resource to a portable computer that is frequently used at that location. For example, the docking station may connect the portable computer to a network and to peripheral devices, such as a larger monitor or keyboard than is available on the computer itself.

For security reasons, it may be desirable to lock a computer to such a docking station so that it cannot be taken by someone other than the authorized user, Such a lock will be a physical lock that attaches to the computer while it is in place in the docking station and prevents it from being removed. This physical lock may be operated using a physical key that is inserted into a keyhole of the lock to engage or disengage the lock.

However, in such a scenario, it may be inconvenient for the user to find and use the physical key to lock or unlock the computer to the docking station. If the user has to frequently leave that work station, for example, to attend meetings, it may become too inconvenient to unlock the computer in each instance and then re-engage the lock upon returning to the docking station. The user may, in such a case, stop using the physical lock altogether and simply leave the lock disengaged at all times. This may be convenient for the user, but renders the physical lock totally ineffective to provide security for the portable computer when it is in the docking station and unattended by the authorized user.

Consequently, the present specification describes a method and device for providing security to a portable computer in a docking station while also minimizing the inconvenience to the authorized user who may need to frequently remove the computer from the docking station.

In one example, the present specification describes a method of securing a computer at a docking station, the docking station including a physical lock for selectively engaging with a locking interface of the computer to prevent removal of the computer from the docking station, the method including: during a period of time in which the computer is registering a presence of an authenticated user at the computer, maintaining the physical lock of the docking station in an unlocked state disengaged from the locking interface of the computer; and when the computer is entering a locked state in response to a departure of the authenticated user from the computer, signaling the physical lock of the docking station to engage with the locking interface of the computer to prevent removal of the computer from the docking station.

In another example, the present specification describes a computer including: a central processing unit; a memory providing an operating system to the central processing unit; an electronic interface to interface electronically with a docking station; a locking interface to engage a physical lock selectively securing the computer to the docking station; and an electronic locker driver to control the physical lock of the docking station, through the electronic interface, based on a state of the operating system.

In another example, the present specification describes a docking station for a computer including: an electronic interface to interface electronically with the computer; a physical lock for selectively engaging a locking interface of the computer to prevent removal of the computer from the docking station; and an electronic locker to control the physical lock based on signals received through the electronic interface from the computer indicating a detected presence or departure of an authenticated user at the computer.

As used herein and in the following claims, the term "computer" refers to a portable computer, such as a laptop, notebook or tablet computer, that is configured to engage with a docking station that provides additional resources to the portable computer.

As used herein and in the following claims, the term "physical lock" refers to a hardware lock with one or more moving parts that selectively engage and disengage with the physical shell, housing or exterior of a computer. The physical lock, when engaged, prevents removal of the computer from its current location, such as being received in a docking station. The moving part or parts of a physical lock may be moved by an electric motor or solenoid under the control of electronic logic, referred to herein as an "electronic locker."

As used herein and in the following claims, the term "locking interface" refers to a portion of the computer that is engaged by the moving part or parts of the physical lock.

The locking interface may include a recess or other feature on the computer that is engaged by the lock.

FIG. 1 is a flow chart of an example method of securing a computer at a docking station consistent with the disclosed implementations. In the example of FIG. 1, the method of securing a computer at a docking station is implemented where the docking station includes a physical lock for selectively engaging with a locking interface of the computer to prevent removal of the computer from the docking station. As shown in FIG. 1, the method includes: during a period of time in which the computer is registering a presence of an authenticated user at the computer, maintaining (152) the physical lock of the docking station in an unlocked state disengaged from the locking interface of the computer; and when the computer is entering a locked state in response to a departure of the authenticated user from the computer, signaling (154) the physical lock of the docking station to engage with the locking interface of the computer to prevent removal of the computer from the docking station.

In this way, the authorized user does not need to have or use a physical key to lock and unlock the computer to and from the docking station. Rather, the computer uses any of a number of different techniques to monitor for the presence or departure of the authorized user and locks or unlocks the computer in the docking station accordingly.

Figure 2:
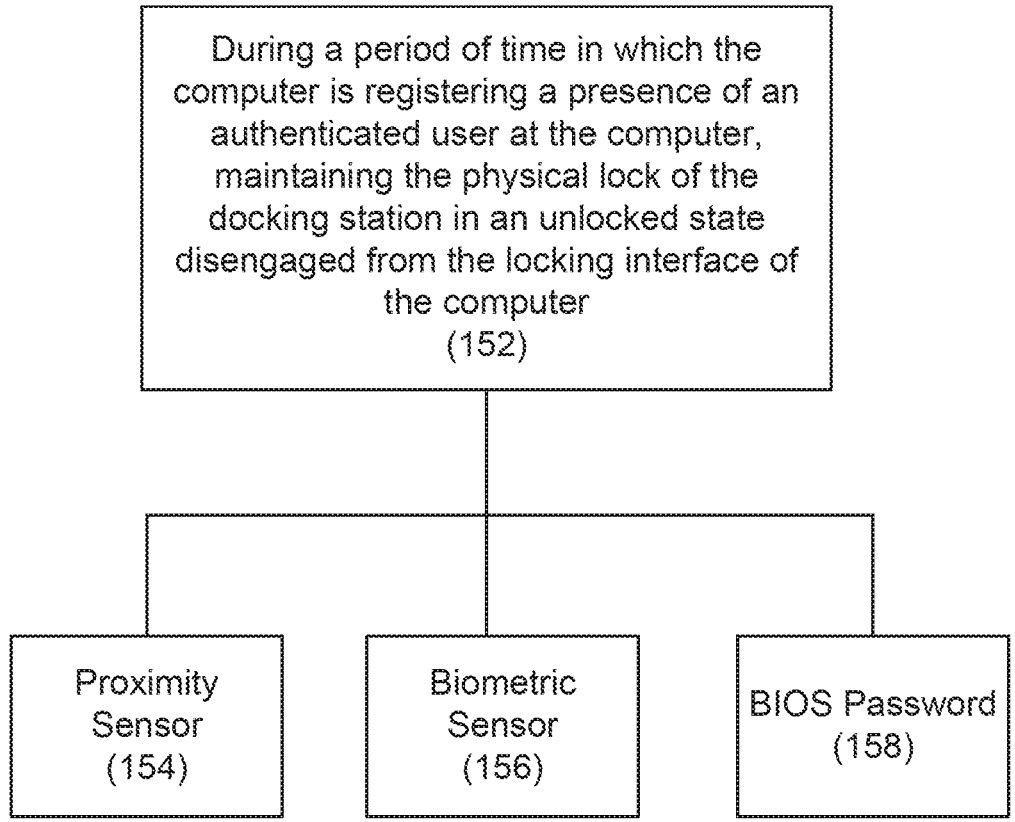
FIG. 2 is a flow chart showing additional examples for implementing the method of FIG. 1 consistent with the disclosed implementations.

FIG. 2 is a flow chart showing additional examples for implementing the method of FIG. 1 consistent with the disclosed implementations. As shown in FIG. 2, the computer can use any of a number of techniques to determine whether the authorized user is present at the computer.

For example, if the user enters a password or other credentials, the computer will determine that the authorized user is present. The computer will then, as described further below, signal the docking station to disengage the physical lock holding the computer in the docking station. While the authorized user is present, the lock is maintained in this disengaged state so that the authorized user can remove the computer from the docking station, as needed, without having to operate, physical or manually, the physical lock of the docking station. The computer is presumed to be secure due to the presence of the authorized user without the lock of the docking station being engaged.

Alternatively, a proximity sensor (154) may be incorporated into the computer or the docking station, or may be separate but in communication with the computer or docking station. The proximity sensor (154) may be, for example, a Radio Frequency Identification (RFID) or Near Field Communication (NFC) reader that detects the presence of a corresponding RFID or NFC tag that is presumed to be kept by and on the person of the authorized user. Consequently, when the proximity sensor detects the presence of the corresponding proximity key, the authorized user is presumed to be present and the computer will then, as described further below, signal the docking station to disengage the physical lock holding the computer in the docking station. Then, during any time period that the authorized user is present, as determined by continuing to detect the presence of the proximity key, the lock is maintained in this disengaged state.

In another alternative, a biometric sensor (156) may be incorporated into the computer or the docking station, or may be separate but in communication with the computer or docking station. The biometric sensor (156) may be, for example, a fingerprint reader, a retinal scanner, a voice analyzer or other biometric sensor.

When the corresponding biometric of the authorized user, such a fingerprint, retinal scan or voiceprint, is detected by the biometric sensor (156) the authorized user is determined to be present and the computer will then, as described further below, signal the docking station to disengage the physical lock holding the computer in the docking station. Then, as above, during the time period that the authorized user is present, the lock is maintained in this disengaged state.

In another alternative, when the computer is booting, the authorized user may enter a password to the Basic Input/Output System (BIOS) to indicate his or her presence and cause the computer to signal the docking station to disengage the physical lock. This may be advantageous when the computer is locked to the docking station and the user does not want to wait for the computer to fully boot up before the lock is disengaged. With a modified BIOS, a password triggering the unlocking signal can be entered shortly after the computer is powered without waiting for full boot up. An administrator password could also be used to access controls for the electronic locker described herein.

Figure 3:
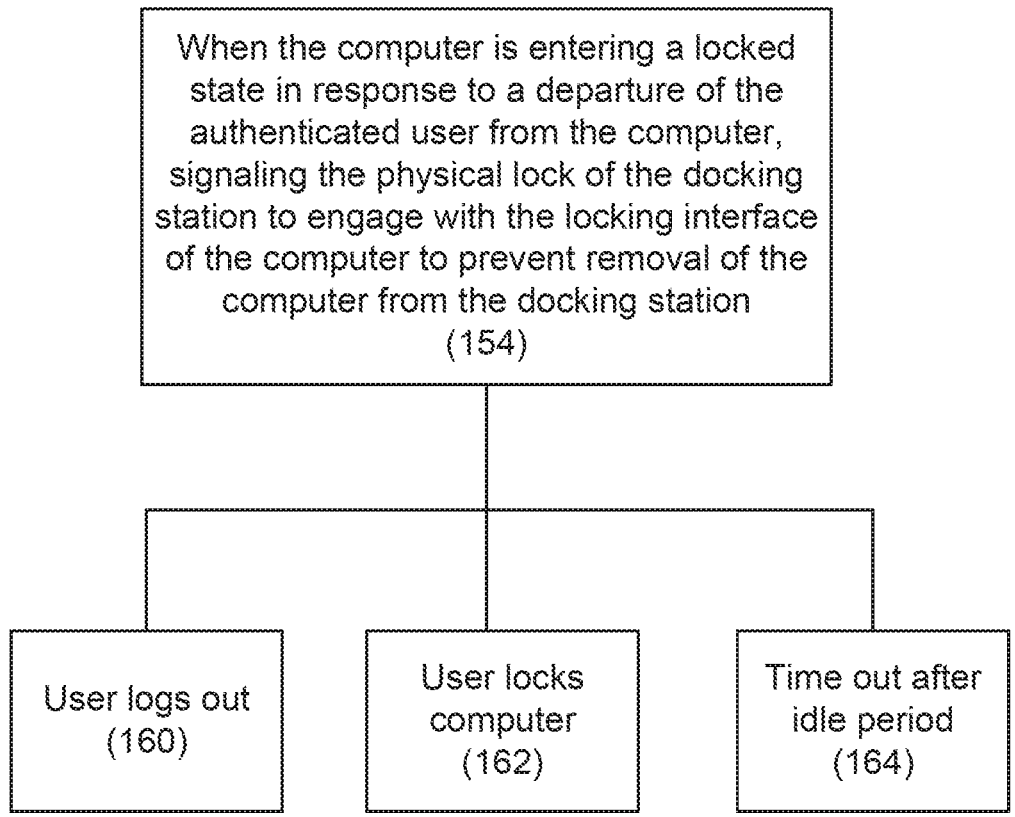
FIG. 3 is a flow chart showing additional examples for implementing the method of FIG. 1 consistent with the disclosed implementations.

FIG. 3 is a flow chart showing additional examples for implementing the method of FIG. 1 consistent with the disclosed implementations. As shown in FIG. 3, the computer can use any of a number of techniques to determine whether the authorized user is departing from the computer and will no longer be present.

For example, the user may log out (160) with or without powering down the computer. This is done by inputting a log out command to the computer's operating system. When the user logs out, it is presumed that the user is not thereafter present at the computer. Consequently, the computer automatically signals the docking station to engage the physical lock to secure the computer in the docking station.

After receiving the signal indicating log out or other indication of the departure of the authorized user, the docking station may wait for a short period of time before engaging the lock. In this way, an authorized user who is leaving his or her workstation for the night may log out and power down the computer. The computer signals the docking station of the log out event and powers down. The docking station receives the signal, but waits to engage the physical lock. If the user then removes the computer from the docking station to leave for the evening, the docking station does not engage the physical lock. However, after the short wait period; if the computer is not removed from the docking station, the docking station will determine that the user is leaving the computer in the docking station while not being present and will engage the physical lock to secure the computer. Alternatively, the user could remove the computer from the docking station, while the physical lock is disengaged, and then power down the computer for transport.

In another example, the user may command the operating system to lock the computer. This is not a physical lock, but a software lock and is frequently done to secure data access to the computer while the authorized user is not present. A lock screen may then be displayed by the computer requiring entry of a password or other credential before access to any data on the computer is allowed. If the user locks the computer (162) in this way, the computer will determine that the user is not going to be present for some time period thereafter and can automatically signal the docking station to engage the physical lock to secure the computer to the docking station.

In another example, computers can automatically enter a locked or logged out state after a period of time in which the computer is idle, i.e., not receiving user input. If the computer times out in this matter after an idle period (164), the computer will determine that the user is not present and can automatically signal the docking station to engage the physical lock to secure the computer to the docking station.

Figure 4:
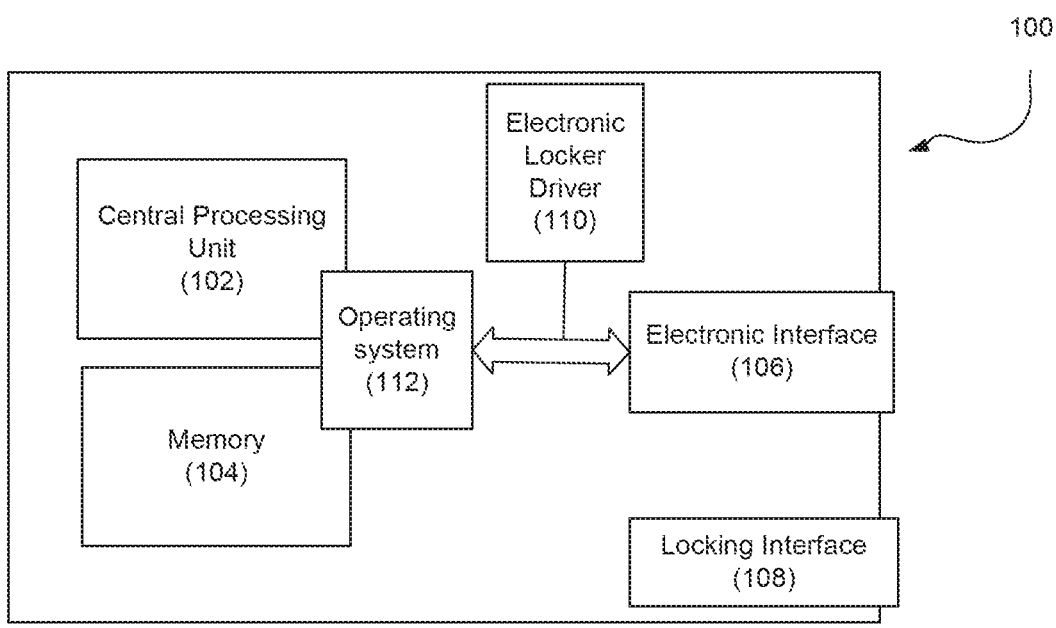
FIG. 4 is a diagram of an example computer consistent with the disclosed implementations.

FIG. 4 is a diagram of an example computer consistent with the disclosed implementations. As shown in FIG. 4, the example computer (100) including: a central processing unit (102); a memory (104) providing an operating system (112) to the central processing unit (CPU) (102); an electronic interface (105) to interface electronically with a docking station; a locking interface (108) to engage a physical lock selectively securing the computer to the docking station; and an electronic locker driver (110) to control the physical lock of the docking station, through the electronic interface (106), based on a state of the operating system (112).

The electronic locker driver (110) can be a module implemented by the CPU (102), a firmware module, or a hardware module, such as an Application Specific Integrated Circuit. The functionality of the electronic locker driver (110) is that of the method shown in FIG. 1 and may include any or all of the examples of FIGS. 2 and 3. Specifically, using any of the described techniques, or others, when the computer (100) determines that the authorized user is present, the electronic locker driver (110) sends a signal through the electronic interface (106) to the docking station to disengage the physical lock from the locking interface (108) of the computer (100). Additionally, when the computer (100), using any of the described techniques, or others, determines that the authorized user is departing or not present, the electronic locker driver (110) sends a signal through the electronic interface (106) to the docking station to engage the physical lock to the locking interface (108) of the computer (100) to prevent removal of the computer (100) from the docking station.

As indicated above, the operating system (112) or the state of the operating system may be used to make a determination about the presence or absence of the authorized user. For example, if the operating system (112) is in a logged in state, the user may be considered to be present, particularly if user input is being received. Alternatively, if the operating system (112) is a logged out or locked state, the user is considered departing or absent.

If the operating system is entering a sleep state or hibernation state, the user is considered to be departing or absent. A sleep state is a low power state in which the computer is inactive, but is still powered. A hibernation state is when the current state of the operating system is stored in non-volatile memory and the computer is then powered off.

The electronic locker driver (110) can monitor the status of the operating system (112), including a transition to a new state, such as being logged in and operational, locked, logged out, put to sleep or hibernated. The driver (110) can then send a control signal to the docking station through the electronic interface (106) according to the state of the operating system (112) as indicative of whether an authorized user is or is not present to control the physical lock of the docking station appropriately.

Figure 5:
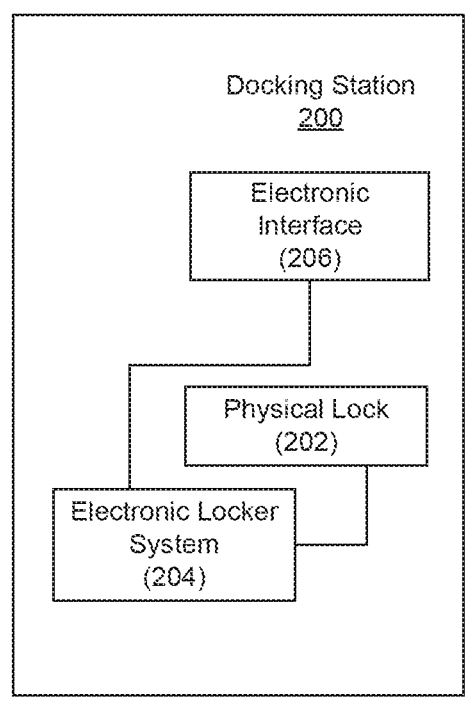
FIG. 5 is a diagram of an example docking station consistent with the disclosed implementations.

FIG. 5 is a diagram of an example docking station consistent with the disclosed implementations. As shown in FIG. 5, the docking station (200) for a computer includes: an electronic interface (206) to interface electronically with the computer; a physical lock (202) for selectively engaging a locking interface of the computer to prevent removal of the computer from the docking station; and an electronic locker (204) to control the physical lock based on signals received through the electronic interface from the computer indicating a detected presence or departure of an authenticated user at the computer.

As described above, signals from the electronic locker driver (110, FIG. 4), will be received by the electronic locker (204) through the electronic interface (206). The electronic locker (204) will then control the physical lock (202) to engage or disengage as directed by the signals from the electronic locker driver (110, FIG. 4). The electronic locker (204) will control the moving part or parts of the physical lock (202), for example, by an electric motor or solenoid, to engage or disengage the physical lock (202).

Figure 6:
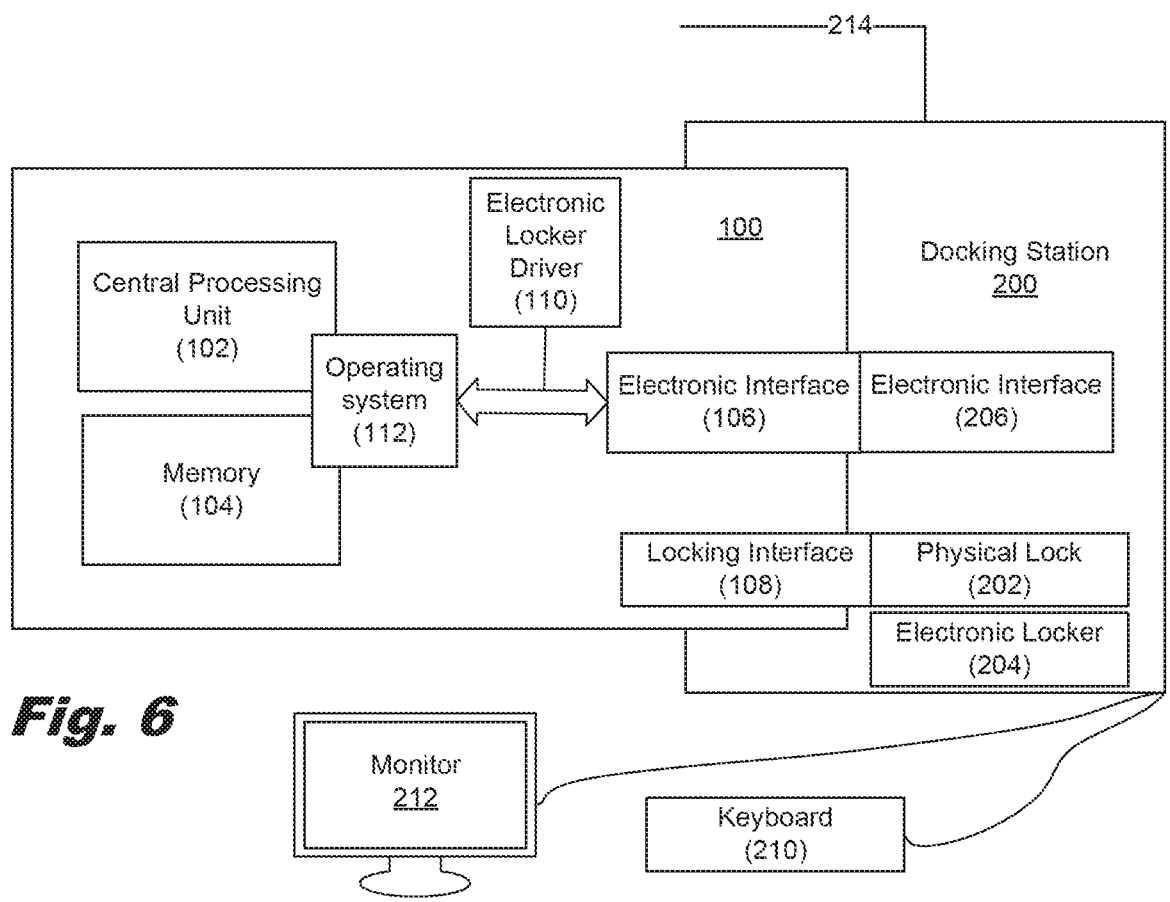
FIG. 6 is a diagram of an example computer and docking station consistent with the disclosed implementations.

FIG. 6 is a diagram of an example computer and docking station consistent with the disclosed implementations. As shown in FIG. 6, the computer (100) is received in the docking station (200). Whether the computer (100) can be removed from the docking station (200) will depend on whether the physical lock (202) is engaged or disengaged from the locking interface (108) of the computer (100).

As also shown in FIG. 6, the electronic interface (106) of the computer (100) is interfaced with the electronic interface (206) of the docking station (200). This allows the computer (100) to make use of additional resources provided by the docking station (200). These resources may include a hard-wired network connection (214) or one or more peripheral devices, such as a monitor (212) or keyboard (210). The electronic interface (106/206) also provides for the communication of signals from the electronic locker driver (110) to the electronic locker (204) as described above.

Additionally, the electronic locker (204) can be operated remotely. For example, a signal can be provided over the network connection (214) to the electronic locker (204) to engage or disengage the physical lock (202). In this way, the authorized user or a system administrator can remotely control the physical lock (202) as may be needed when not physically present at the computer (100).

The signaling to the electronic locker (204) or between the electronic locker driver (110) and the electronic locker (204) can use any protocol, for example, Inter-Integrated Circuit (120) bus, System Management Bus (SMBus), RS-232 serial, Universal Serial Bus (USB) and others.

Figure 7:
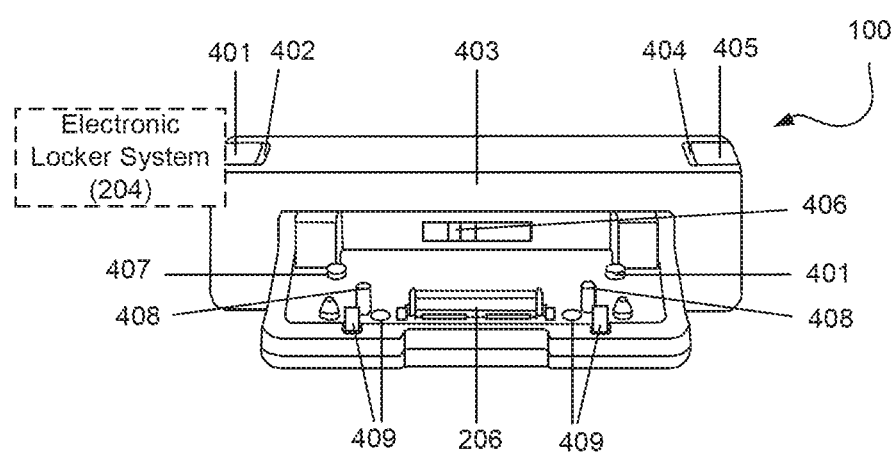
FIG. 7 is a drawing of an example docking station consistent with the disclosed implementations.

FIG. 7 is a drawing of an example docking station consistent with the disclosed implementations. As shown in FIG. 7, an example docking station (200) may include the following features. A power button (401) and power light (402) are provided to power and indicate power to the docking station and a received computer. A battery size lever (406) adapts the docking station (200) to different battery sizes. A visual alignment indicator (403), guide pads (407) and docking posts (408) helps the user install a computer in the docking station and correctly make connection between the computer and the electronic interface (206) of the docking station (200). A docking light (404) indicated proper docking of the computer.

An ejection button (405) releases the computer from the docking station (200), The physical lock described above may be a mechanism that selectively permits or prevents operation of the ejection button (405) under control of the electronic locker (204).

Computer ejection mechanisms (409) engage the computer and are released by operation of the eject button (405). These ejection mechanisms (409) may hook into corresponding recesses on the computer prior to being released. The physical lock described above may be a mechanism that selectively permits or prevents operation of the ejection mechanisms (409) under control of the electronic locker (204).

Figure 8:
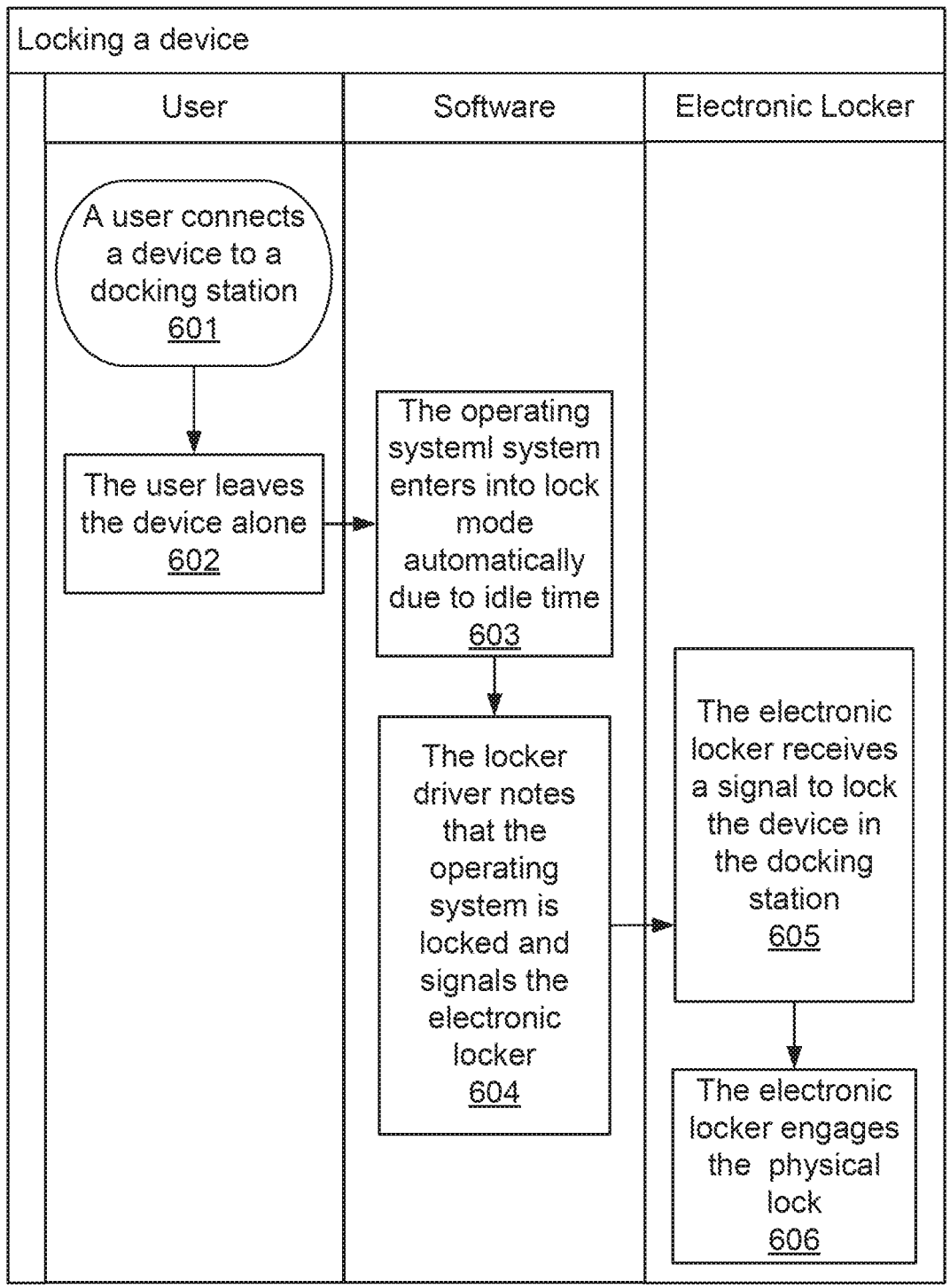
FIG. 8 is a flow chart of an example method of locking a computer to a docking station consistent with the disclosed implementations.

FIG. 8 is a flow chart of an example method of locking a computer to a docking station consistent with the disclosed implementations. In the example of FIG. 8, the user connects the computer to the docking station (601). The user then leaves the device alone (602) for a period of time.

As a result of this idle time, the operating system enters automatically enters a locked mode (603), as described above. The electronic locker driver (110, FIG. 6), registers that the operating system is in or entering a locked state and signals (604) the electronic locker (204, FIG. 6).

The electronic locker receives the signal. In response, the electronic locker operates the physical lock (202, FIG. 6) to engage the lock to secure the computer to the docking station.

Figure 9:
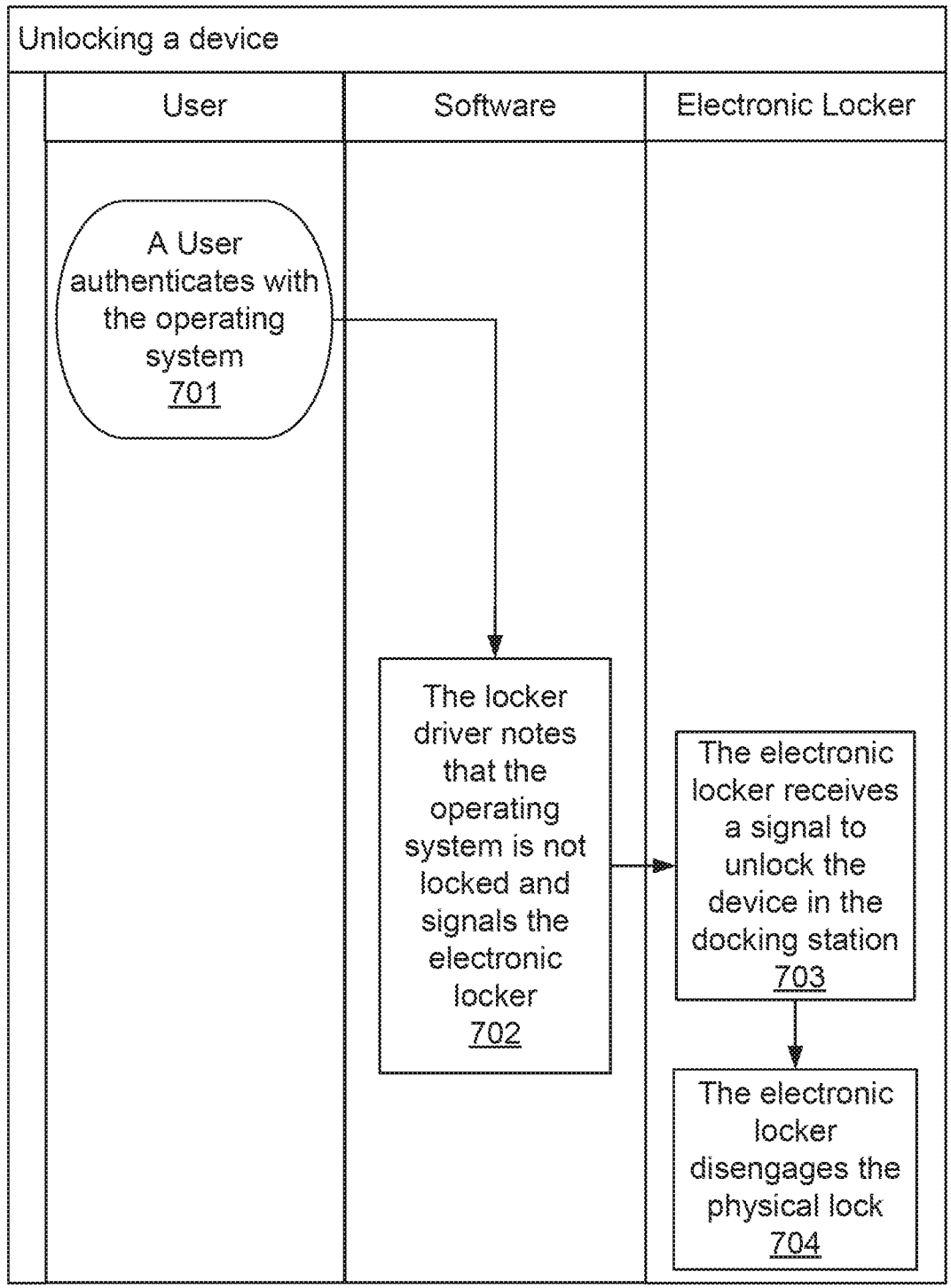
FIG. 9 is a flow chart of an example method of unlocking a computer to a docking station consistent with the disclosed implementations.

FIG. 9 is a flow chart of an example method of unlocking a computer to a docking station consistent with the disclosed implementations. In the example of FIG. 9, the user first authenticates with the operating system of the computer (701), This may be done, for example, by entering a password or other credential, by operating a biometric sensor with the correct biometric input, or by presenting a proximity key to a proximity sensor.

The electronic locker driver (110, FIG. 6), registers that the operating system is in or entering an operational state and signals (702) the electronic locker (204, FIG. 6). The electronic locker receives the signal (703) and, in response, operates the physical lock (202, FIG. 6) to disengage the lock to release (704) the computer from the docking station.

The preceding description has been presented only to illustrate and describe examples of the principles described. This description is not intended to be exhaustive or to limit these principles to any precise form disclosed. Many modifications and variations are possible in light of the above teaching. For example, in the event of a forgotten password, a system administrator can use another Operating System user to log in and unlock or configure the BIOS or Unified Extensible Firmware Interface (UEFI) to allow boot from some other device such as flash drive and then use another operational system to unlock the docking station. Alternatively, a BIOS/UEFI module driver can be implemented to communicate with the locker system.

What is claimed is:

1. A method of securing a computer at a docking station, the docking station comprising a physical lock for selectively engaging with a locking interface of the computer to prevent removal of the computer from the docking station, the method comprising:
   during a period of time in which the computer is registering a presence of an authenticated user at the computer, maintaining the physical lock of the docking station in an unlocked state disengaged from the locking interface of the computer; and
   when the computer is entering a locked state in response to a departure of the authenticated user from the computer, signaling the physical lock of the docking station to engage with the locking interface of the computer to prevent removal of the computer from the docking station,
   wherein, in response to a log out of the computer, waiting a period of time before locking the physical lock of the docking station to allow the authorized user an opportunity to remove the computer from the docking station before the physical lock of the docking station engages.

2. The method of claim 1, further comprising:
   automatically detecting departure of the authenticated user and, in response, engaging the physical lock of the docking station; and
   automatically detecting a subsequent return of the authenticated user and, in response, automatically disengaging the physical lock of the docking station.

3. The method of claim 1, wherein departure of the authenticated user is determined by a period of time during which the computer is idle without user input.

4. The method of claim 1, wherein the presence of the authenticated user at the computer is determined by a proximity sensor sensing a proximity key, comprising a Radio Frequency Identification (RFID) or Near Field Communication (NFC) tag, that is worn by the authenticated user.

5. The method of claim 1, wherein the presence of the authenticated user at the computer is determined by a biometric sensor.

6. The method of claim 1, wherein the presence of the authenticated user at the computer is determined by entry of a Basic Input/Output System (BIOS) password.

7. The method of claim 1, further comprising controlling the physical lock of the docking station using a command transmitted through a computer network to the docking station.

8. The method of claim 1, further comprising, when the computer is booting, accepting a password with a Basic Input/Output System (BIOS) and, in response to the password being entered, unlocking the physical lock of the docking station before the computer is fully booted up.

9. The method of claim 1, further comprising, in response to the user removing the computer from the docking station in the period of time before the physical lock of the docking station engages, preventing the physical lock from engaging.

10. The method of claim 1, further comprising controlling operation of the physical lock of the docking station remotely via a network to which the docking station is connected.

11. A computer comprising:
   a central processing unit;
   a memory providing an operating system to the central processing unit;
   an electronic interface to interface electronically with a docking station;
   a locking interface to engage a physical lock selectively securing the computer to the docking station; and
   an electronic locker driver to control the physical lock of the docking station, through the electronic interface, based on a state of the operating system, wherein in response to a log out of the computer, the electronic locker driver to wait a period of time before locking the physical lock of the docking station to allow an authorized user an opportunity to remove the computer from the docking station before the physical lock of the docking station locks.

12. The computer of claim 11, wherein, when the operating system is interacting with an authenticated user, the electronic locker driver maintains the physical lock of the docking station in an unlocked state.

13. The computer of claim 11, wherein, when the operating system is entering any of a locked state, a sleeping state and a hibernating state, the electronic locker driver signals the physical lock of the docking station to engage the locking interface of the computer.

14. The computer of claim 13, wherein the operating system automatically enters at least one of a locked state, a sleeping state and a hibernating state after a predetermined period being idle without user input.

15. The computer of claim 13, wherein the electronic interface is to interface the computer with at least one peripheral electronic device of the docking station.

16. The computer of claim 13, wherein, when the operating system is entering an unlocked state following user authentication, the electronic locker driver signals the physical lock of the docking station to disengage from the locking interface of the computer.

17. A docking station for a computer comprising:
- an electronic interface to interface electronically with the computer;
- a physical lock for selectively engaging a locking interface of the computer to prevent removal of the computer from the docking station; and
- an electronic locker to control the physical lock based on signals received through the electronic interface from the computer indicating a detected presence or departure of an authenticated user at the computer,
- wherein in response to a log out of the computer, the electronic locker to wait a period of time before locking the physical lock of the docking station to allow the authorized user an opportunity to remove the computer from the docking station before the physical lock of the docking station locks.

18. The docking station of claim 17, wherein:
- when the electronic locker is signaled that the authenticated user is present at the computer, the electronic locker maintains the physical lock of the docking station in an unlocked state; and
- when the electronic locker is signaled that the authenticated user is departing from the computer, the electronic locker engages the physical lock of the docking station to a locked state.

19. The docking station of claim 17, wherein, in response to the user removing the computer from the docking station in the period of time before the physical lock of the docking station engages, the electronic locker to avoid the physical lock engaging.

* * * * *